US011911689B2

(12) United States Patent
Jones et al.

(10) Patent No.: US 11,911,689 B2
(45) Date of Patent: Feb. 27, 2024

(54) SYNCHRONIZED, FULLY PROGRAMMABLE GAME CONTROLLERS

(71) Applicant: Activision Publishing, Inc., Santa Monica, CA (US)

(72) Inventors: Allan Jones, Valencia, CA (US); Karthik Iyer, San Jose, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 230 days.

(21) Appl. No.: 17/131,282

(22) Filed: Dec. 22, 2020

(65) Prior Publication Data

US 2021/0178253 A1    Jun. 17, 2021

Related U.S. Application Data

(62) Division of application No. 15/847,553, filed on Dec. 19, 2017, now Pat. No. 10,981,051.

(51) Int. Cl.
    *A63F 13/235*        (2014.01)
    *A63F 13/92*         (2014.01)
    (Continued)

(52) U.S. Cl.
    CPC .......... *A63F 13/235* (2014.09); *A63F 13/327* (2014.09); *A63F 13/335* (2014.09); *A63F 13/92* (2014.09)

(58) Field of Classification Search
    CPC .... A63F 13/235; A63F 13/327; A63F 13/335; A63F 13/92
    See application file for complete search history.

(56) References Cited

U.S. PATENT DOCUMENTS 5,530,796 A    6/1996   Wang
5,561,736 A    10/1996   Moore
(Continued)

FOREIGN PATENT DOCUMENTS

AU          768367       3/2004
AU     2005215048     10/2011
(Continued)

OTHER PUBLICATIONS

Himonas et al., "A Robust Real-Time Transport Protocol For Multimedia Information Retrieval in an ATM Network", IEEE International Performance, Computing and Communications Conference, 1997, pp. 177-183.
(Continued)

*Primary Examiner* — Yingchuan Zhang
(74) *Attorney, Agent, or Firm* — Novel IP (57) ABSTRACT

Embodiments of the present specification provide systems and methods for operating game controllers. Microprocessor-controlled game controllers enable recreation of identical gaming scenarios with precision and accuracy. At least one microprocessor is connected to one or more game controllers. The microprocessor is programmed to synchronize the game controllers externally. Additionally, the microprocessor is programmed to modify one or more game controls that are provided by the game controllers. In embodiments of the present specification, game controllers are embedded with a wireless microcontroller that allow for remote feeding of commands to the microcontrollers.

20 Claims, 9 Drawing Sheets

Piggyback embedded wireless module for remote commands.

602

Streaming (51) Int. Cl.
  *A63F 13/335* (2014.01)
  *A63F 13/327* (2014.01)

(56) References Cited

U.S. PATENT DOCUMENTS

| | | |
|---|---|---|
| 5,563,946 A | 10/1996 | Cooper |
| 5,649,092 A | 7/1997 | Price |
| 5,671,365 A | 9/1997 | Binford |
| 5,685,775 A | 11/1997 | Bakoglu |
| 5,699,518 A | 12/1997 | Held |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,745,781 A | 4/1998 | Ekanadham |
| 5,768,511 A | 6/1998 | Galvin |
| 5,768,528 A | 6/1998 | Stumm |
| 5,825,877 A | 10/1998 | Dan |
| 5,835,692 A | 11/1998 | Cragun |
| 5,835,727 A | 11/1998 | Wong |
| 5,878,228 A | 3/1999 | Miller |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,918,013 A | 6/1999 | Mighdoll |
| 5,920,325 A | 7/1999 | Morgan |
| 5,923,324 A | 7/1999 | Berry |
| 5,956,709 A | 9/1999 | Xue |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |

(56) References Cited

U.S. PATENT DOCUMENTS

| | | |
|---|---|---|
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,457,281 B1 | 10/2016 | Lam |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2006/0068917 A1 | 3/2006 | Snoddy |
| 2009/0113448 A1 | 4/2009 | Smith |
| 2009/0137315 A1* | 5/2009 | Wu .......... A63F 13/06 463/37 |
| 2012/0242590 A1* | 9/2012 | Baccichet ........ A63F 13/42 345/173 |
| 2014/0344725 A1 | 11/2014 | Bates |
| 2016/0191671 A1 | 6/2016 | Dawson |
| 2017/0266552 A1 | 9/2017 | Paradise |
| 2018/0096623 A1* | 4/2018 | Xia .......... A63F 13/92 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |

(56) References Cited

FOREIGN PATENT DOCUMENTS

| | | |
|---|---|---|
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0770965 A1 | 5/1997 |
| EP | 0935194 A2 | 8/1999 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 10177495 | 6/1998 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 9744747 | 11/1997 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Abstract of Chen et al., "A Queueing Approach to the Performance Evaluation of DQDB", IEEE International Phoenix Conference on Computers and Communications, 1992, pp. 636-643.

Abstract of Abdelzaher et al., "Web Content Adaptation to Improve Server Overload Behavior", Computer Networks, May 1999, vol. 31, No. 11-16, pp. 1563-1577.

\* cited by examiner

SYNCHRONIZED, FULLY PROGRAMMABLE GAME CONTROLLERS

CROSS-REFERENCE

The present application is a division application of U.S. patent application Ser. No. 15/847,553, entitled "Synchronized, Fully Programmable Game Controllers" and filed on Dec. 19, 2017, which is herein incorporated by reference in its entirety.

FIELD

The present specification discloses systems and methods for testing, analyzing and improving multiplayer gaming environments. More specifically, the present specification is related to programmatically synchronizing multiple game controllers in order to evaluate the effects of external conditions on a video game gameplay session.

BACKGROUND

Game developers are often faced with the challenge of simulating gaming scenarios, and repeatedly recreating the stimulated gaming scenarios, in order to analyze and/or test the game for various factors and under various external conditions. In one example, it may be required to measure the impact of network traffic on the gaming traffic and, ultimately, the gameplay experience. The impact can be significant given playing video games or role-playing games, such as First Person Shooter (FPS) games, wirelessly on the Internet, is increasing.

Contention and prioritization of video packets over other packets (like FPS packets) could potentially result in a streaming event (external condition) improperly changing the outcome of a match. Stated differently, a match that one player would have won has now been lost because FPS packets were not prioritized over other packets, such as video packets. One potential solution would be to program routers to prioritize the gaming console of the player, but this only helps once the packets enter the Service Set Identifier (SSID) of the player. However, after the packets are on their way to a dedicated server, the packets do not receive prioritized treatment over the myriad video packets constantly transmitted through the Internet. With the increasing popularity and adoption of electronic sports (ESports), this could be detrimental to match fairness.

The impact of streaming delay caused by packet prioritization can be demonstrated by creating a reproducible scenario where two players in a video game end up in a very close match. The game or match would need to be created repeatedly while providing the same outcome. Once the gaming scenario is constantly repeated, other factors, such as network traffic, can be varied to observe and analyze the influence over the constantly repeated gaming scenario. Recreating the scenario would require extreme precision to stage a close match where one opponent narrowly defeats another opponent. A conventional approach may require modifying the gaming program or source code to achieve the desired scenario with repeatable precision. However, such a modification could be cumbersome and internal to the game scenario. Additionally, the modification made at the gaming program-level may be fixed, and to recreate any other scenario would require a renewed effort at programming the game differently to suit the new scenario. Therefore, this approach can be time-consuming and inefficient.

Therefore, what is needed is a system and method for creating and recreating game scenarios with accuracy and precision such that control over the game is provided externally and is independent of the game itself to thereby demonstrate what external factors influence the game and to what extent such external factors influence the game.

SUMMARY

The following embodiments and aspects thereof are described and illustrated in conjunction with systems, tools and methods, which are meant to be exemplary and illustrative, not limiting in scope.

In some embodiments, the present specification discloses a system for synchronizing multiple game controllers, the system comprising: a first game controller; a second game controller; a first programmable microprocessor communicating with the first game controller, wherein the first programmable microprocessor provides first program instructions executable by the first game controller; and a second programmable microprocessor communicating with the second game controller and the first programmable microprocessor, wherein the second programmable microprocessor provides second program instructions executable by the second game controller; wherein the first programmable microprocessor is configured to initiate an execution of the first program instructions and signal the second programmable microprocessor to begin execution of the second program instructions such that execution operation of the first and the second game controllers are synchronized.

Optionally, the first and the second programmable microcontrollers are each embedded within the first and the second game controllers respectively.

Optionally, the first and the second programmable microcontrollers are respectively connected externally with a cable to the first and the second game controllers.

Optionally, the first and the second game controllers are respectively in communication with a first gaming console and a second gaming console.

Optionally, the first gaming console and the second gaming console each are a part of a first local network and a second local network, respectively.

Optionally, the first gaming console and the second gaming console are in communication with each other over the Internet.

Optionally, at least one of the first and the second game controllers are operated wirelessly.

In some embodiments, the present specification discloses a method for synchronizing multiple game controllers, the method comprising: initiating a program execution by a first programmable microprocessor, wherein the first programmable microprocessor is in data communication with a first game controller; and signaling by the first programmable microprocessor to a second programmable microprocessor to begin the program execution, wherein the second programmable microprocessor is in data communication with a second game controller and the first programmable microprocessor, wherein the program execution is synchronized for the first and the second game controllers.

Optionally, the method further comprises embedding the first and the second programmable microcontrollers each within the first and the second game controllers respectively.

Optionally, the method further comprises connecting the first and the second programmable microcontrollers externally with a cable to the first and the second game controllers respectively.

Optionally, the first and the second game controllers are respectively in communication with a first gaming console and a second gaming console.

Optionally, the method comprises operating the at least one of the first and the second game controllers wirelessly.

In some embodiments, the present specification discloses a system for operating a game controller, the system comprising: a wireless module embedded within the game controller, wherein the game controller comprises a plurality of inputs configured to be manually activated by a human player; and a processor remotely located from the game controller, wherein the processor communicates wirelessly with the wireless module for activating one or more of the plurality of inputs without requiring manual activation by the human player.

Optionally, the processor communicates commands to the wireless module and wherein said commands activate the one or more plurality of inputs.

Optionally, the processor comprises at least one of a personal computer, a laptop, and a portable computing device.

Optionally, the wireless module comprises one of a Radio Frequency (RF) module, a Wi-Fi module, and a Bluetooth module.

Optionally, the wireless module is located or embedded within the game controller.

Optionally, the wireless module is attached to an exterior physical housing defining an outer periphery of the game controller.

In some embodiments, the present specification discloses a method for operating a game controller, the method comprising: using a processor located remotely from the game controller, wirelessly communicating at least one command for execution by the game controller, wherein the game controller comprises a plurality of inputs configured to be manually activated by a human player; using a wireless module in data communication with the game controller, receiving the at least one command; and using the game controller, executing the at least one command, wherein, when executed by the game controller, the at least one command is configured to activate one or more of the plurality of inputs without requiring manual activation by the human player.

Optionally, the communicating from the processor comprises communicating from at least one of a personal computer, a laptop, and a portable computing device.

Optionally, the receiving the at least one command by the wireless module comprises using one of a Radio Frequency (RF) module, a Wi-Fi module, and a Bluetooth module.

In some embodiments, the present specification discloses a method for operating a game controller, the method comprising: using a processor located remotely from the game controller, wirelessly communicating at least one command for execution by the game controller, wherein the game controller comprises a plurality of inputs configured to be manually activated by a human player; using a wireless module embedded within the game controller, receiving the at least one command; and using the game controller, executing the at least one command, wherein, when executed by the game controller, the at least one command is configured to activate one or more of the plurality of inputs without requiring manual activation by the human player.

Optionally, said embedded wireless module is located within an exterior physical housing defining an outer periphery of the game controller.

Optionally, said embedded wireless module is attached to an exterior physical housing defining an outer periphery of the game controller.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

The present specification relates to synchronizing multiple game controllers and driving a game play session through programmatic logic applied to each of the game controllers, replacing a user's manual input. Game controllers are programmable and can be synchronized externally and independently of a gaming program. Embodiments of the present specification enable repeatable creation of a gaming scenario with precision and accuracy. In some embodiments, microprocessor-controlled game controllers are provided, wherein at least one microprocessor (or microcontroller) is connected to one or more game controllers and wherein the microprocessor is programmed to synchronize the game controllers externally. Additionally, the microprocessor is programmed to modify one or more game controls that are provided by the game controllers. In embodiments of the present specification, wireless microcontrollers are embedded within game controllers to allow for the remote transmission of commands to the microcontrollers. Integrating a wireless microcontroller within the game controller allows for commands to be transmitted in real time or near real time to one or more game controllers without requiring commands to be customized and pre-programmed into an embedded microcontroller. Therefore, a wireless microcontroller allows for customization of game controller as needed.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

For purposes of the present specification, a gaming console is a computing device that displays a video game that one or more players can play.

For purposes of the present specification, a game controller is an interactive module that is manually manipulated by a player to interface with a video game, typically to provide controlling input to the video game. The game controller is in communication with a gaming console through a wired or a wireless connection. Game controllers may include all its variants, such as but not limited to, joystick, steering wheel, keyboard and mouse, touchscreen, light gun, yoke, pedal, paddle, trackball, and gamepad.

While aspects of the present specification may be described herein with reference to various game levels or modes, characters, roles, or game items, associated with a First-Person-Shooter (FPS) game, it should be appreciated that any such examples are for illustrative purposes only, and are not intended to be limiting. The systems and methods described in detail herein may be used in any genre of multiplayer video game, without limitation.

The terminology used within this specification and detailed description of the various embodiments is for the purpose of describing particular embodiments only and is not intended to limit the invention.

Figure 1:
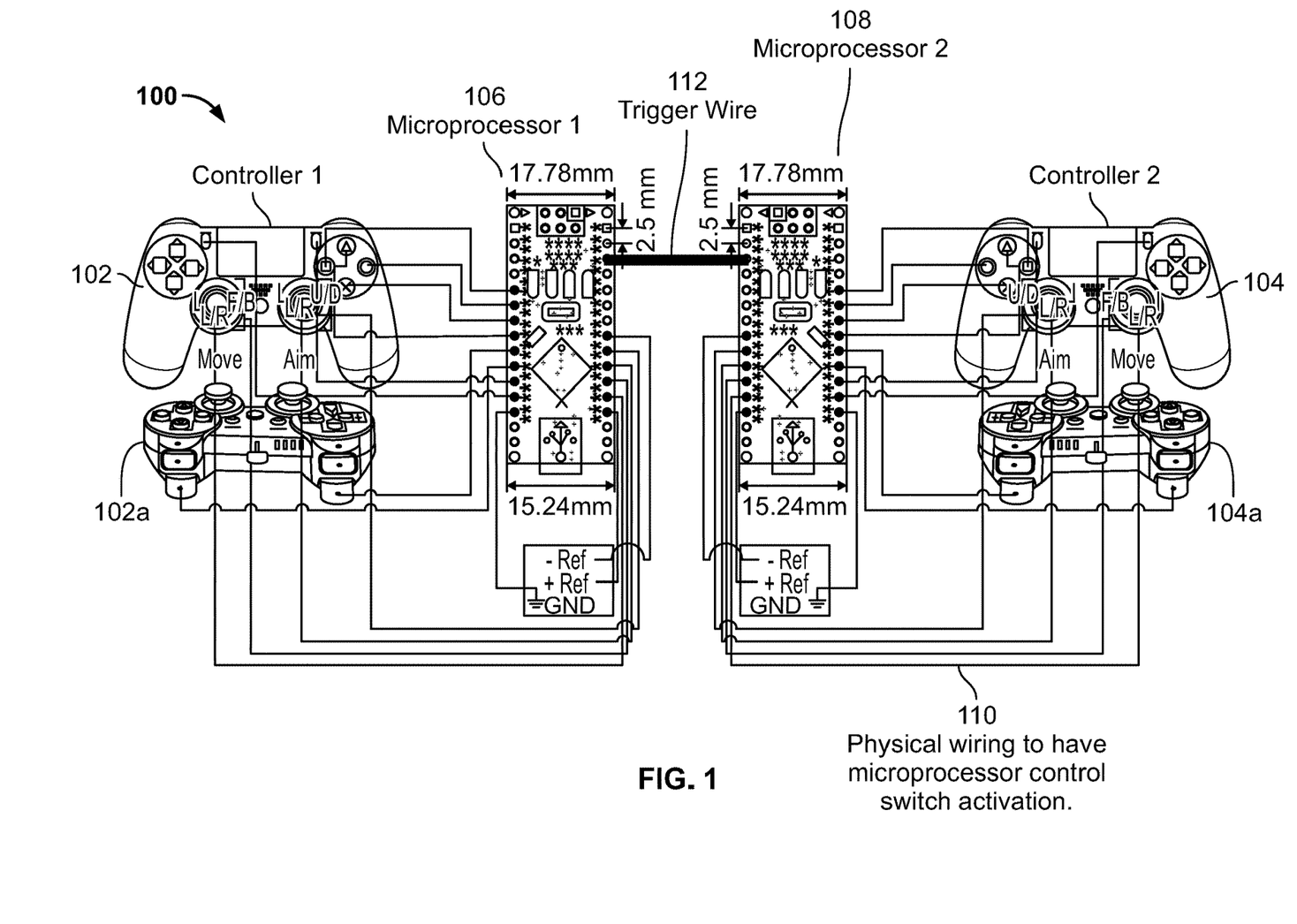
FIG. 1 illustrates an exemplary arrangement for synchronizing a first game controller and a second game controller, in accordance with some implementations of the present specification.

FIG. 1 illustrates an exemplary arrangement 100 for synchronizing a first game controller 102 and a second game controller 104, in accordance with some implementations of the present specification. In an embodiment, first game controller 102 and second game controller 104 interface with first and second (separate) gaming consoles, respectively. In some embodiments, each gaming console is operational within different local networks and the game consoles communicate with each other over the Internet. In an alternative embodiment, first game controller 102 and second game controller 104 interface with a single gaming console. First game controller 102 and second game controller 104 each have multiple buttons that enable a player to provide control input to their respective gaming consoles. A front perspective view 102a of first game controller 102 shows additional buttons that may be provided with game controller 102. Similarly, a front perspective view 104a of second game controller 104 shows additional buttons that may be provided with game controller 104. While FIG. 1 illustrates one type of game controllers, other types of game controllers with different provisions for providing controlling input to the gaming consoles may be applicable in different embodiments of the present specification.

A first programmable microprocessor 106 communicates with game controller 102, and a second programmable microprocessor 108 communicates with game controller 104. In embodiments, microprocessors 106 and 108 are respectively embedded within game controllers 102 and 104. In some alternative embodiments, microprocessors 106 and 108 are connected externally through one or more cables with their corresponding game controllers 102 and 104, respectively. In yet other embodiments, microprocessors 106 and 108 are connected wirelessly. Microprocessors 106 and 108 are programmable, and may be programmed to execute a specific set of commands or instructions. In an embodiment, microprocessors 106 and 108 are programmed remotely and wirelessly. In one embodiment, microprocessor 106 is programmed to execute a first set of commands to control operation of game controller 102, while microprocessor 108 is programmed to execute a second set of commands to control operation of game controller 104. FIG. 1 illustrates a physical wiring scheme 110 to enable connections between microprocessor 106 and different buttons of game controller 102 and to enable connections between microprocessor 108 and different buttons of game controller 104. In embodiments, microprocessors 106 and 108 are programmed to execute any set of commands that can be performed by their corresponding game controllers. A typical command, for example, may be to enable a game controller to shift left for 1.75 seconds, shift right for 1.73 seconds, aim weapon, and pull a trigger, within a video game. In embodiments, microprocessors 106 and 108 are any type of microprocessors that provide sufficient input-output (I/O) ports to interface with game controllers 102 and 104. In one embodiment, microprocessors 106 and 108 are Arduino Nano microprocessors. In embodiments, microprocessors 106 and 108 are connected to each other with a trigger wire 112. In some other embodiments, microprocessors 106 and 108 are connected to each other wirelessly. In one embodiment, microprocessor 106 is a primary processor and microprocessor 108 is a secondary processor. Once microprocessor 106 is activated to execute its program, it signals microprocessor 108 through wire 112 to initiate execution of the program on microprocessor 108 as well, thereby achieving synchronization between execution of programs by game controllers 102 and 104.

In alternative embodiments, the present specification is extended to multiple game controllers configured with corresponding programmable microprocessors. One of the microprocessors may be a primary processor that signals all other microprocessors to synchronize program execution on their respective game controllers.

Figure 2A:
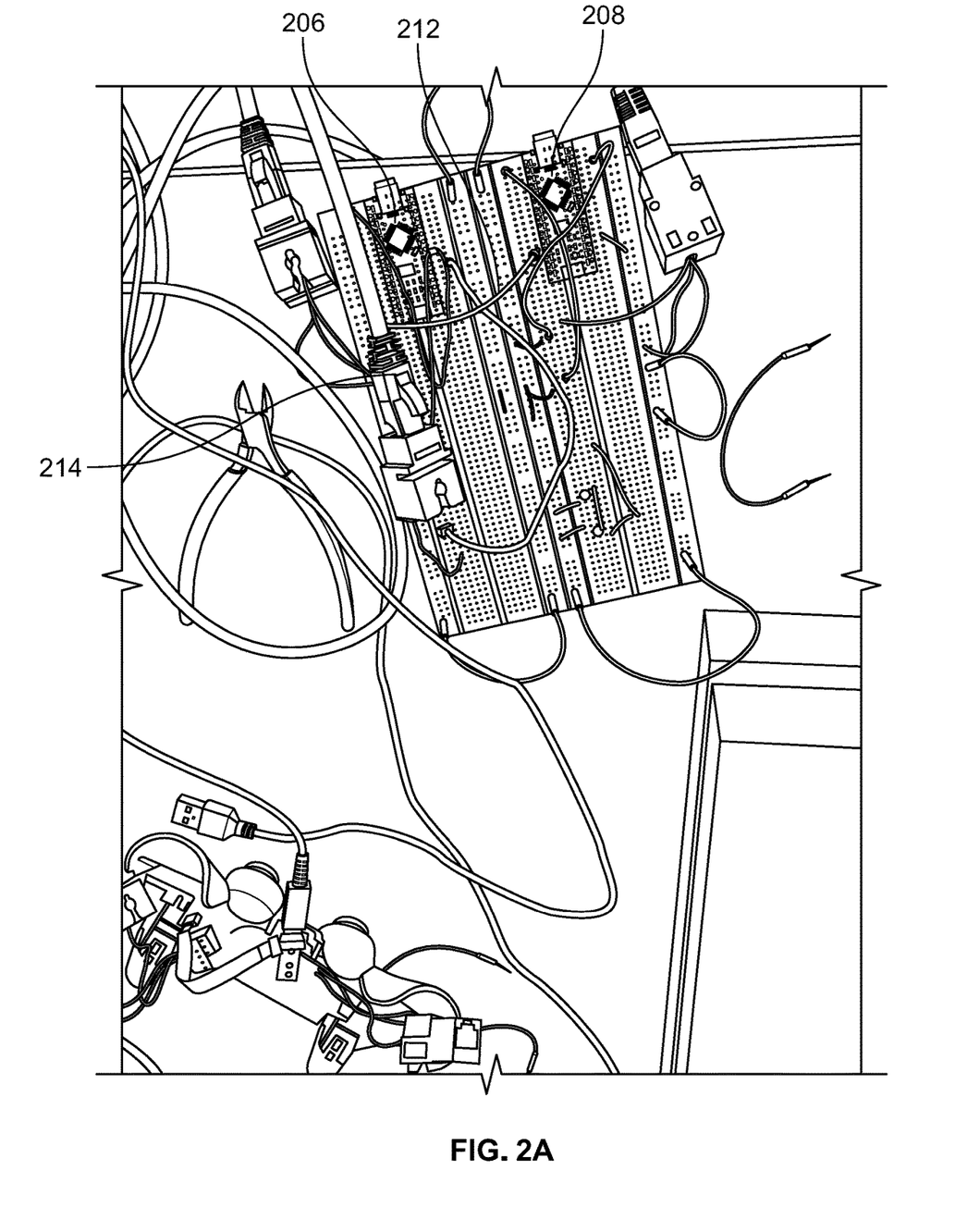
FIG. 2A illustrates an exemplary implementation of an arrangement for synchronizing two game controllers, in accordance with some embodiments of the present specification.
Figure 2B:
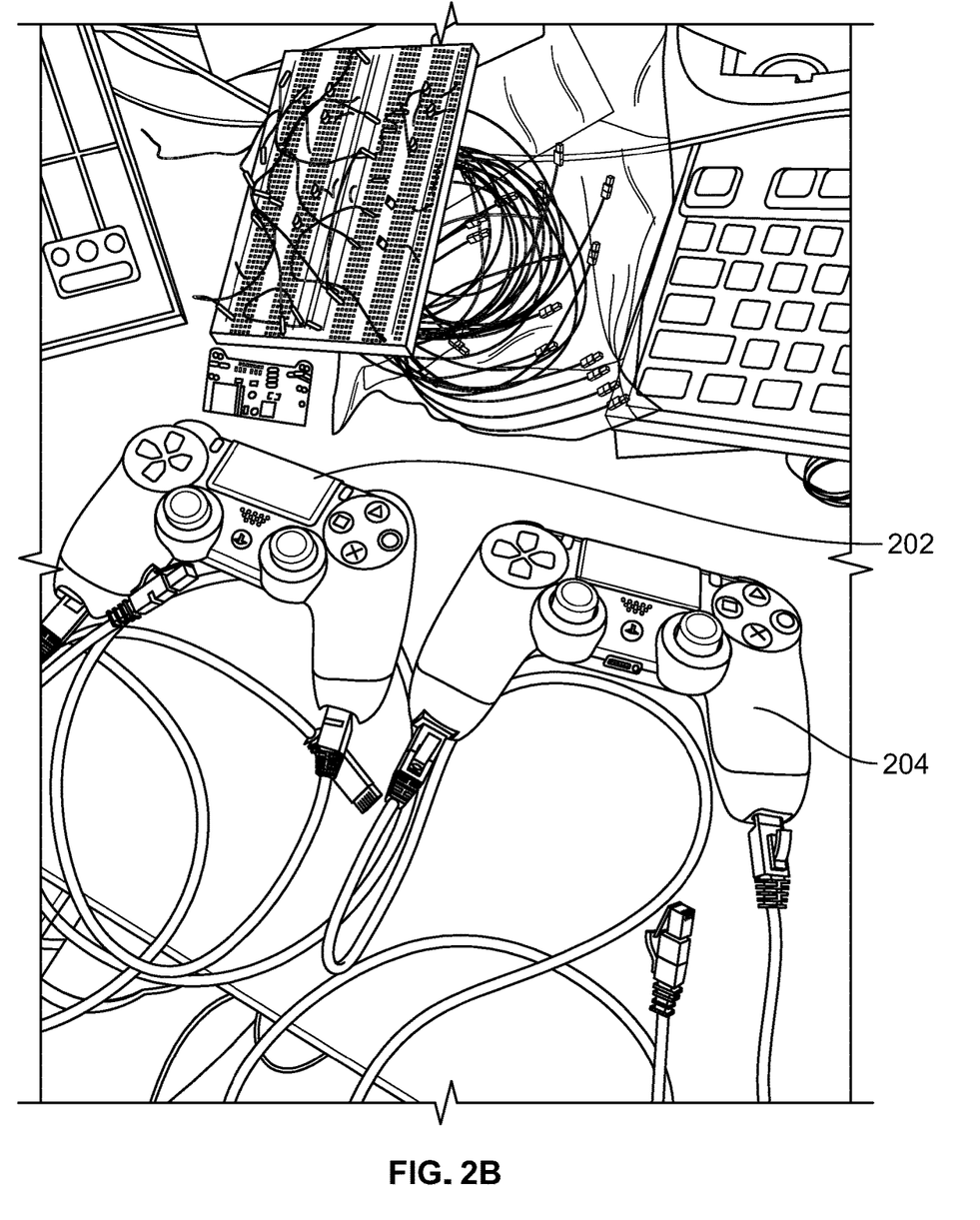
FIG. 2B illustrates another view of the exemplary implementation of FIG. 2A, in accordance with some embodiments of the present specification.

FIG. 2A illustrates an exemplary implementation of an arrangement to synchronize two game controllers, in accordance with some embodiments of the present specification. Microprocessors 206 and 208 are connected to separate game controllers and to each other through a trigger wire 212. FIG. 2A shows a connector 214 that is used for connecting microprocessor 206 to a game controller. FIG. 2B illustrates another view of the actual implementation of the arrangement of FIG. 2A, in accordance with some embodiments of the present specification. Referring together to FIGS. 2A and 2B, in one embodiment, a first programmable microprocessor 206 and a second programmable microprocessor 208 are connected respectively to a first game controller 202 and a second game controller 204.

Figure 3:
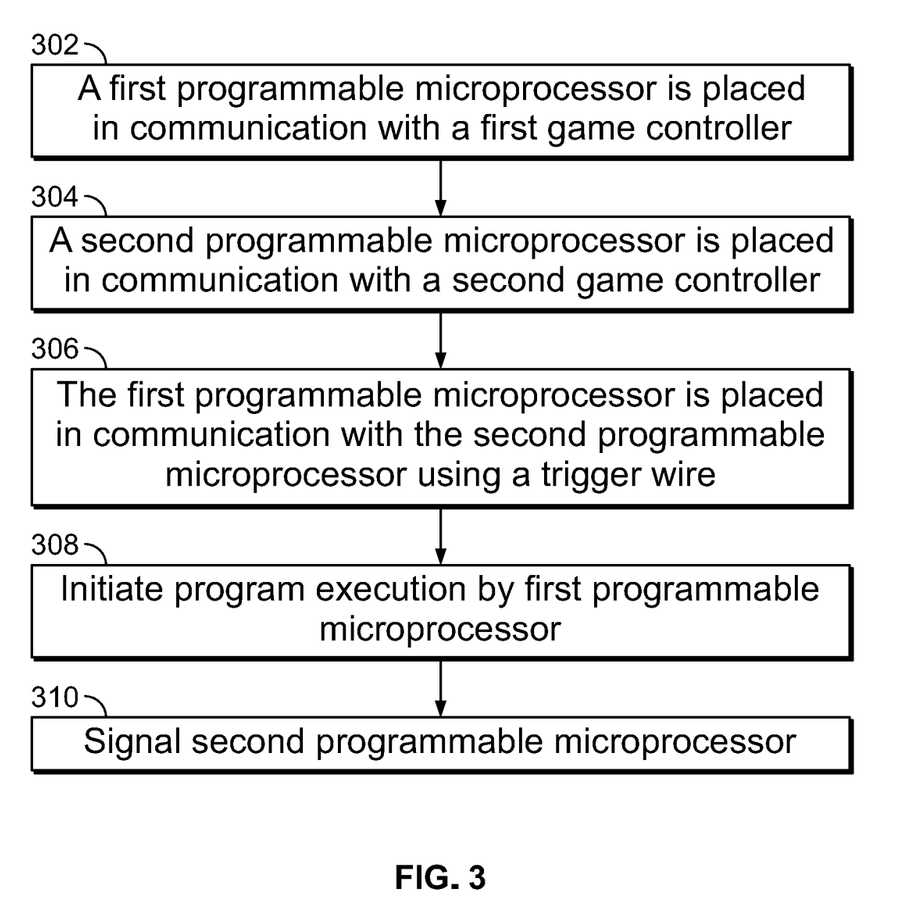
FIG. 3 is a flow chart describing a method for synchronizing two game controllers, in accordance with some embodiments of the present specification.

FIG. 3 is a flow chart describing a method for synchronizing two game controllers, in accordance with some embodiments of the present specification. The first programmable microprocessor, comprising code for a first program, is placed in communication with a first game controller in step 302. The first program may comprise instructions for execution by the first game controller. A second programmable microprocessor is placed in communication with a second game controller in step 304. In embodiments, both microprocessors are pre-programmed. In other embodiments, both microprocessors can be custom-programmed on demand. The second programmable microprocessor is placed in communication with the first programmable microprocessor in step 306. In embodiments, a trigger wire connects the two programmable microprocessors. In some other embodiments, the two programmable microprocessors are connected wirelessly. At 308, a first programmable microprocessor initiates execution of the first program. At 310, the first programmable microprocessor sends a signal over the trigger wire to initiate execution of a second program, which comprises instructions for execution by the second game controller. In an embodiment, the first microprocessor sends current over the trigger wire while the second microprocessor detects positive voltage on the trigger wire as a signal to initiate execution of its program. In embodiments where the two microprocessors communicate wirelessly, a trigger would execute a similar process as with a trigger wire, with appropriate acknowledgement, e.g. Ack/Nak, messaging. Additionally, a synchronized timer function may be incorporated to minimize potential wireless latency. Therefore, the first and the second game controllers are synchronized in operating the programs meant for their execution.

Figure 4:
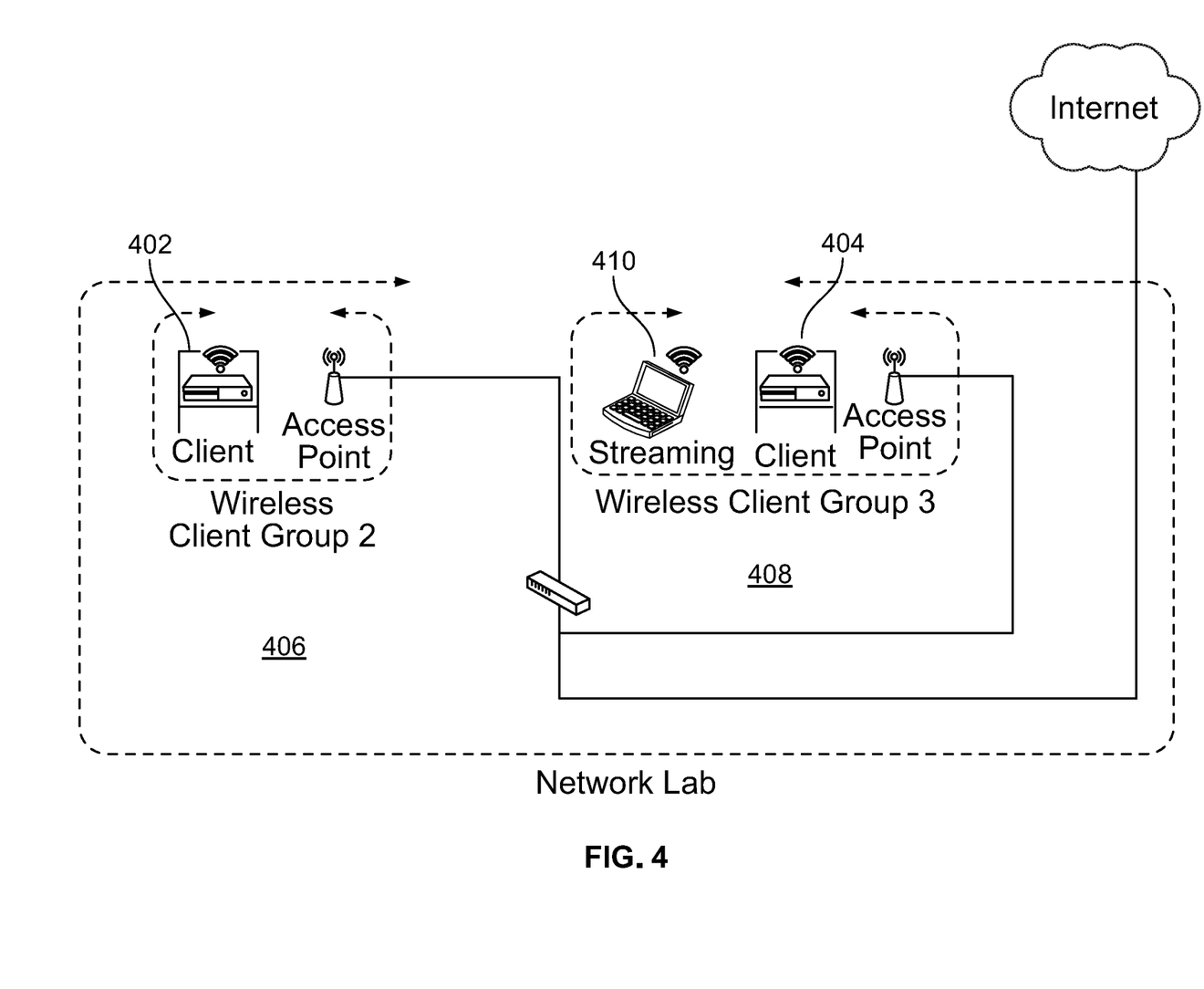
FIG. 4 illustrates an exemplary layout for implementing the embodiments of the present specification.

Embodiments of the present specification enable the writing of a control program that works independently of any game and could be reproduced for other gaming systems. FIG. 4 illustrates an exemplary scenario for implementing embodiments of the present specification. In an exemplary scenario, it is desirable to test whether due to the contention and prioritization of video packets over other packets (such as gaming packets) a streaming event in a local network in which a gaming console operates, changes the outcome of a match. A match that an opponent would win could be lost because the packets in the network of the opponent were not prioritized over the video packets in a streaming event.

Figure 5A:
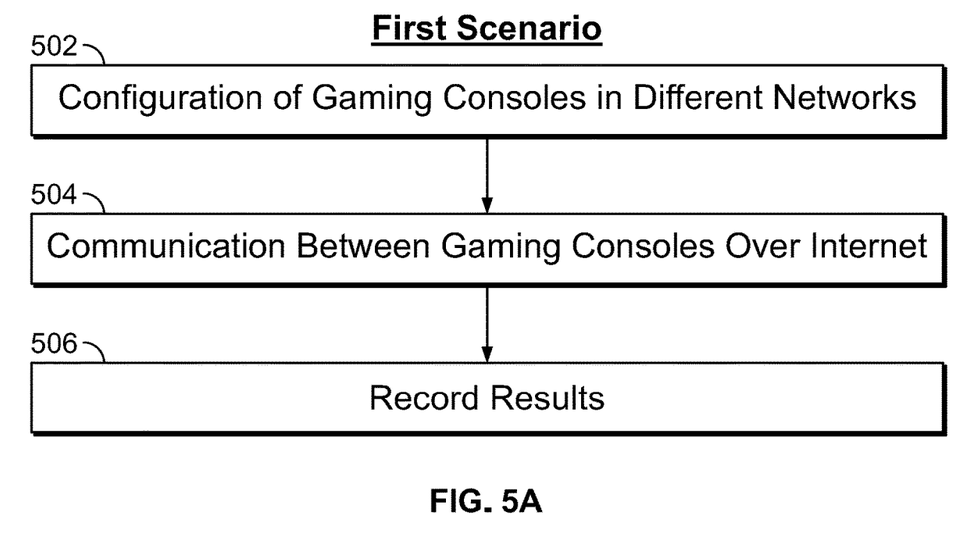
FIG. 5A is a flowchart illustrating an exemplary testing process that is implemented using some embodiments of the present specification.

FIG. 5A is a flowchart illustrating an exemplary testing process that is implemented using some embodiments of the present specification. Referring simultaneously to components shown in FIG. 4, and the steps of FIG. 5A, the test is performed under a first scenario where a scenario represents a unique environmental condition. For the purposes of the present specification, an environmental condition may be a factor external to a gaming console that affects the performance of a player using that gaming console. The environmental condition may be varied to test the outcome in the form of impact on the operation of the game controllers interfacing with gaming consoles 402 and 404.

In a first scenario, at 502, the two gaming consoles 402 and 404, are configured within different local networks 406 and 408, respectively. At 504, gaming consoles 402 and 404 communicate with each other wirelessly over the Internet so that a first player using gaming console 402 plays against an opponent who is a second player using gaming console 404. In an exemplary embodiment involving an FPS game, a "close call" scenario is generated where the second player wins by one bullet. The scenario is generated with programming of the game controllers associated with the two gaming consoles 402 and 404. Programming of the game controllers enables configuration of a desired scenario repeatedly, with precision, and without any human intervention. The scenario requires millisecond precision which is achieved by leveraging programmable microprocessors connected to the game controllers of the first gaming console 402 and the second gaming console 404, in accordance with the embodiments of the present specification. In some embodiments, avatars of the gaming scenario are lined up in the same position repeatedly, followed by repeated execution of the scenario where the second player wins by one bullet in an identical manner. The scenario where the second player wins by one bullet is programmed through a series of commands residing within code at the first and the second microprocessors, and executable by the first and second game controllers of consoles 402 and 404, respectively. In one embodiment, the commands are programmed separately for each microprocessor. In another embodiment, both microprocessors execute the same set of commands when the primary microprocessor signals the secondary microprocessor to do so. Once a reference or baseline is provided, where the second player barely wins in the same manner over and over again, over the first player, other factors may be varied to perform the test. At 506, the results of the match are recorded. In a test conducted by the applicants, it was noted that the results of the match remained constant on repeated execution of the scenario where the second player wins by one bullet.

Figure 5B:
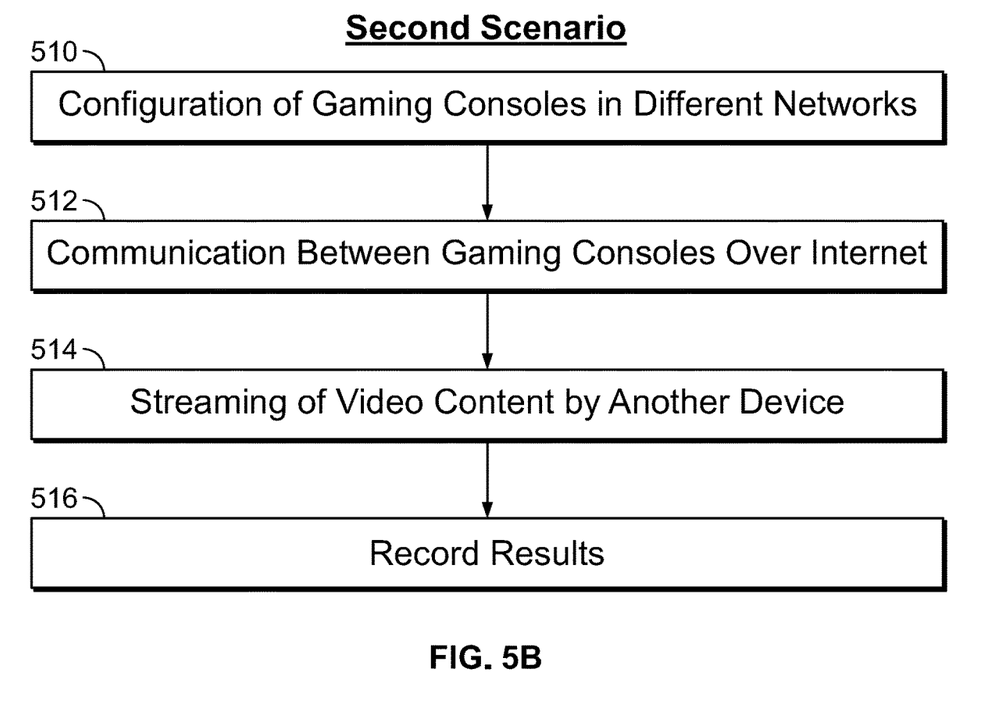
FIG. 5B is a flowchart illustrating another exemplary testing process that is implemented using some embodiments of the present specification.

FIG. 5B is a flowchart illustrating an exemplary testing process in a different scenario that is implemented using some embodiments of the present specification. Referring simultaneously to components shown in FIG. 4, and the steps of FIG. 5B, the test is performed under a different scenario. In a second scenario, at 510, the two gaming consoles 402 and 404, are configured within different local networks 406 and 408, respectively. At 512, gaming consoles 402 and 404 communicate with each other wirelessly over the Internet so that a first player using gaming console 402 plays against an opponent who is a second player using gaming console 404. In an exemplary embodiment involving an FPS game, the same "close call" scenario is re-created where the second player wins by one bullet. The scenario requires millisecond precision which is achieved by leveraging programmable microprocessors connected to the game controllers of the first gaming console 402 and second gaming console 404, in accordance with the embodiments of the present specification. Programming the game controllers provides repeatable precision while executing the same scenario, and without any human intervention. In some embodiments, avatars of the gaming scenario are lined up in the same position repeatedly, followed by repeated execution of the scenario where the second player wins by one bullet in an identical manner. The scenario where the second player wins by one bullet is programmed through a series of commands residing within code at the first and the second microprocessors, and executable by the first and second game controllers of consoles 402 and 404, respectively. Once a reference or baseline is provided, where the second player barely wins in the same manner over and over again, over the first player, other factors may be varied to perform the test. In the second scenario, the variable factor involves enabling a streaming event in one of the networks. At 514, another device 410 streams video content through the Internet, within the local network of console 404, which could potentially affect bandwidth and packet prioritization within that network. The streaming event is enabled in parallel to the execution of the "close-call" scenario in an ongoing gaming session between the first and the second players. At 516, the results of the match are recorded. In a test conducted by the applicants, it was noted that the results of the match indicated that the second player loses the match, demonstrating that packet delivery based on the streaming activity at device 410 was prioritized over the gaming console.

Thus, in using the present specification, results of the match can be observed with and without the streaming activity in the network of the player who is programmed to win repeatedly to determine if other activity on the network (such as streaming) affects the game output due to packet prioritization.

It should be appreciated that the game testing being performed is done expressly through the user control devices and not through any other means. Specifically, while games are frequently tested using bots or programs that interface directly with the video game logic, they are not tested via the actual input control devices manipulated by users in a manner that is both precise and repeatable.

Figure 6:
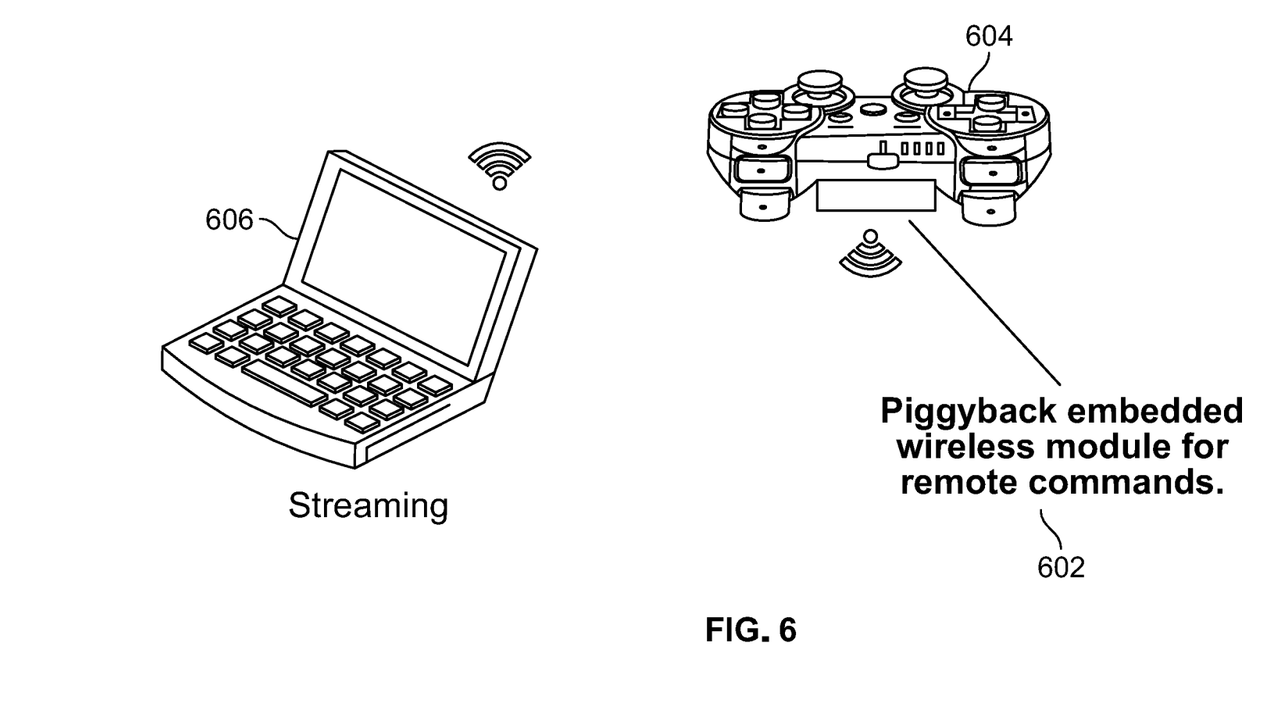
FIG. 6 illustrates an exemplary system environment for operating a game controller, in accordance with some embodiments of the present specification; and, FIG. 7 is a flow chart detailing a method for operating a game controller as described in FIG. 6, in accordance with some embodiments of the present specification.

FIG. 6 illustrates an exemplary system environment for operating a game controller, in accordance with some embodiments of the present specification. In embodiments, a wireless module 602 is embedded within a game controller 604. The embedded wireless module 602, is, in one embodiment, a WiFi microprocessor that enables game controller 604 to execute instructions provided by the microprocessor. Wireless module 602 is in data communication with game controller 604. In some embodiments, wireless module 602 is a microcontroller that is small enough and low powered enough to run off of the power bus housed within controller's 604. In this case, no external wiring or power is required. In some embodiments, wireless module 602 is fitted within the housing of controller 604. In some embodiments, slight structural modifications are required to controller 604 housing to provide sufficient room for wireless module 602. In yet other embodiments, wireless module 602 is located within game controller 604, or is attached to an exterior physical housing defining an outer periphery of game controller 604. In yet other embodiments, wireless module 602 is embedded within game controller 604 such that it is located within or attached to an exterior physical housing defining an outer periphery of game controller 604.

A remotely located processor 606 communicates wirelessly with wireless module 602 to operate the game controller 604. In accordance with embodiments of the present specification, 'remotely located' is defined as located external to a housing defining the outer periphery or exterior surface of game controller 604. In embodiments, and accordingly, a processor is not remote to a game controller if it is located in the same physical housing defining the exterior surface of the game controller. In embodiments, processor 606 communicates commands or instructions that are executable by game controller 604. Processor 606 may be a personal computer, a laptop, a portable computing device, or any other electronic device that enables creating instructions that are executable by game controller 604, and can communicate those instructions wirelessly to wireless module 602. In embodiments, wireless module 602 is a Radio Frequency (RF) module, a Wi-Fi module, a Bluetooth module, or any other module capable of facilitating wireless communication between processor 606 and game controller 604. In embodiments of the present specification decoupling of the command loading to the game controller is enabled so that it happens remotely. Implementing wireless communication within the microprocessor allows for commands to be transmitted in real time or near real time to one or more game controllers 604 without requiring commands to be customized and pre-programmed into an embedded microcontroller. Therefore, a wireless microcontroller allows for customization of game controller as needed.

Figure 7:
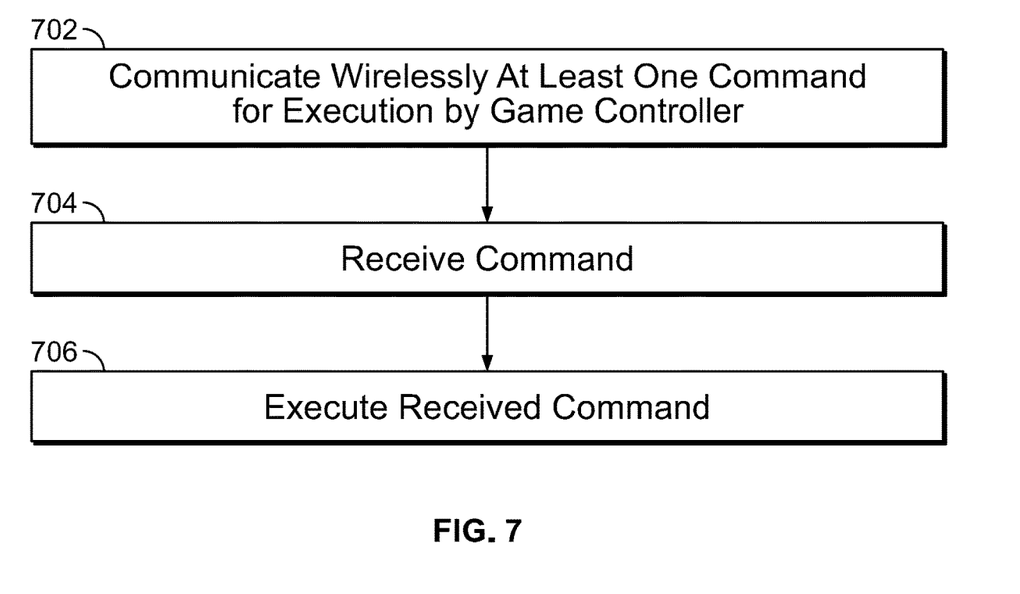

FIG. 7 is a flow chart illustrating an exemplary method for operating a game controller as described in FIG. 6, in accordance with some embodiments of the present specification. At 702, a processor that is remotely located from a game controller wirelessly communicates one or more commands to the game controller. In embodiments, the game controller comprises a wireless module to facilitate the communication between the processor and the game controller. At 704, the wireless module receives one or more commands from the processor. At 706, the game controller executes the received commands. In embodiments, a series of instructions may be wirelessly preloaded on the wireless module, for execution by the game controller at a later time. Preloading the commands may address wireless latency in certain remote systems. In some embodiments, means for synchronizing the time of execution of the program by the game controllers is provided. In one example, a Network Time Protocol (NTP) server is utilized to enable synchronized communication between the processor and the game controller.

Various embodiments of the present specification enable precise control over the microcontroller within one or more game controllers. Embodiments of the present specification may be used to simulate exploits by the player community. In one example, the development of scripting exploits based on movement and button presses of the controller are simulated. Also, once there is a fix for the exploit, embodiments of this system may be used to test the fix to ensure it defeats the exploit.

Gaming systems can be tested precisely for multiplayer scenarios. There are known situations where players use latency to their advantage. In one example, a foot pedal switch may be imagined that cuts or disables transmissions within the network cable of a player. When the switch is applied, the game console used by the player does not transmit packets, and when released the game controller resumes. Players are known to have used these types of systems to "peak" into a room on the map of games to see if any other players are in that room. To implement this, players press the foot pedal and then quickly go into the room, jump back out and release the pedal. During that brief time they may be able to easily assess if there were any other players and their exact positions, allowing the player to exploit that knowledge. In the scenario where the pedal was pressed, the packets were never transmitted, therefore the other players never even saw the exploiting player quickly jump in and out of the room. A scenario like this could be repeated in the testing embodiments of the present specification and enable developing of proper defensive code to defeat such exploits.

In another exemplary scenario, a specific set of button sequences may be entered, which allow players to cause unusual things to happen. In one example, players may be issuing a set of button sequences that cause their avatar to sit down which normally would make their avatar immobile. However, due to a timing window of the button presses, the players may be able to move their avatars around the playfield while seated. Embodiments of the present specification can be used to recreate the exact timing that causes the effect of the button presses with precision, which can in turn be used to remedy the exploit.

Additionally, game developers may be able to test multiple scenarios that could affect a gaming experience. The developers may repeat an exact gaming scenario and vary other parameters to observe their impact.

Moreover, it is common for players who are idle or inactive players to be kicked from a video game that they were playing. Embodiments of the present specification may be used to avoid being kicked due to inactivity. The player may program a game controller used to play the game to keep the game session live while not having to pay attention to the game controller. This is also useful when a player participates in a game session to observe the match.

Embodiments of the present specification may be adapted for players with disabilities. A player who is unable to interface with a game controller due to a physical disability, may be able to control the game through a remote processor.

Alternatively, any player could remotely control the game controller in accordance with implementations of the present specification. In some embodiments, two players could play a match while they are remotely located from their game controllers.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for operating a game controller, wherein the game controller comprises a plurality of inputs adapted to be manually activated by a human player using the game controller, the system comprising:
    a first non-transient memory remotely located from the game controller, wherein the first non-transient memory comprises a first plurality of programmatic instructions, wherein, when executed by a first processor, generates a video game gameplay session;
    a wireless module embedded within the game controller;
    at least one processor in the game controller; and
    a second non-transient memory remotely located from the game controller, wherein the second non-transient memory comprises a second plurality of programmatic instructions, wherein, when executed by a second processor, data are transmitted wirelessly to the wireless module and wherein the at least one processor in the game controller is configured to use said data to activate one or more of the plurality of inputs without requiring manual activation by the human player and to interface with the video game gameplay session only through said activation of said one or more of the plurality of inputs.

2. The system of claim 1, wherein the plurality of inputs comprises a plurality of buttons and wherein the data comprises commands representative of a sequence of pressing said plurality of buttons.

3. The system of claim 1, wherein the first processor and second processor are remotely located from the game controller and is embedded in at least one of a personal computer, a laptop, or a portable computing device.

4. The system of claim 1, wherein the wireless module comprises one of a Radio Frequency (RF) module, a Wi-Fi module, or a Bluetooth module.

5. The system of claim 1, wherein said wireless module is positioned within an exterior physical housing defining an outer periphery of the game controller.

6. The system of claim 1, wherein, when executed the plurality of programmatic instructions, synchronizes a time of execution of the at least one command by the game controller with an execution of another command by another game controller.

7. A method for operating a game controller, wherein the game controller comprises a plurality of inputs adapted to be manually activated by a human player using the game controller, the method comprising:
    using at least one processor located remotely from the game controller, generating a video game gameplay session;
    using the at least one processor located remotely from the game controller, wirelessly communicating at least one command for execution by the game controller;
    using a wireless module in data communication with the game controller, receiving the at least one command; and
    using the game controller, executing the at least one command, wherein, when executed by the game controller, the at least one command is configured to activate one or more of the plurality of inputs without requiring manual activation by the human player and to interface with the video game gameplay session only through said activation of said one or more of the plurality of inputs.

8. The method of claim 7, wherein said processor is embedded in at least one of a personal computer, a laptop, or a portable computing device.

9. The method of claim 7, wherein the wireless module comprises at least one of a Radio Frequency (RF) module, a Wi-Fi module, or a Bluetooth module.

10. The method of claim 7, wherein said wireless module is embedded in the game controller.

11. The method of claim 10, wherein said wireless module is positioned within an exterior physical housing defining an outer periphery of the game controller.

12. The method of claim 7, wherein the plurality of inputs comprises a plurality of buttons and wherein the at least one command is representative of a sequence of pressing said plurality of buttons.

13. The method of claim 7, further comprising synchronizing a time of execution of the at least one command by the game controller with an execution of another command by another controller.

14. A method for operating a game controller, wherein the game controller comprises a plurality of inputs adapted to be manually activated by a human player using the game controller, the method comprising:
- generating a video game gameplay session, using a processor located remotely from the game controller;
- generating a script, wherein the script comprises a plurality of commands, and wherein each of the plurality of commands is representative of one or more player actions in the videogame gameplay session and wherein the plurality of commands is wirelessly communicated for execution by the game controller;
- using a wireless module in data communication with the game controller, receiving the plurality of commands; and
- using the game controller, executing the plurality of commands, wherein, when executed by the game controller, the plurality of commands is configured to activate one or more of the plurality of inputs without requiring manual activation by the human player and to interface with the video game gameplay session only through said activation of said one or more of the plurality of inputs.

15. The method of claim 14, wherein said processor is embedded in at least one of a personal computer, a laptop, or a portable computing device.

16. The method of claim 14, wherein the wireless module comprises at least one of a Radio Frequency (RF) module, a Wi-Fi module, or a Bluetooth module.

17. The method of claim 14, wherein said wireless module is embedded in the game controller.

18. The method of claim 17, wherein said wireless module is positioned within an exterior physical housing defining an outer periphery of the game controller.

19. The method of claim 14, wherein the plurality of inputs comprises a plurality of buttons and wherein the plurality of commands represent a sequence of pressing said plurality of buttons.

20. The method of claim 14, further comprising synchronizing a time of execution of the plurality of commands by the game controller with an execution of another command by another controller.

* * * * *